(12) United States Patent  
Journade et al.

(10) Patent No.: US 9,032,740 B2  
(45) Date of Patent: May 19, 2015

(54) ENGINE ASSEMBLY FOR AN AIRCRAFT COMPRISING ATTACHMENTS FOR ENGINES OFFSET BELOW ON THE FAN FRAME

(75) Inventors: Frédéric Journade, Toulouse (FR); Laurent Lafont, Pechbusque (FR); Delphine Jalbert, Seilh (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 1191 days.

(21) Appl. No.: 12/918,500

(22) PCT Filed: Feb. 27, 2009

(86) PCT No.: PCT/FR2009/050320  
§ 371 (c)(1),  
(2), (4) Date: Mar. 16, 2011

(87) PCT Pub. No.: WO2009/112777  
PCT Pub. Date: Sep. 17, 2009

(65) Prior Publication Data  
US 2011/0197595 A1 Aug. 18, 2011

(30) Foreign Application Priority Data  
Feb. 28, 2008 (FR) ...................................... 08 51280

(51) Int. Cl.  
*F02C 7/20* (2006.01)  
*B64D 27/26* (2006.01)  
*F01D 25/28* (2006.01)

(52) U.S. Cl.  
CPC .......... *B64D 27/26* (2013.01); *B64D 2027/264* (2013.01); *F01D 25/28* (2013.01); *F02C 7/20* (2013.01); *Y02T 50/672* (2013.01)

(58) Field of Classification Search  
CPC ............. B64D 27/26; B64D 2027/266; B64D 2027/264; B64D 27/10–27/14; F02C 7/20  
USPC ........................................ 60/796, 797; 244/54  
See application file for complete search history.

(56) References Cited

U.S. PATENT DOCUMENTS 2,753,140 A * 7/1956 Hasbrouck et al. ............ 248/555  
2,949,268 A * 8/1960 Eggers et al. .................. 248/555  
(Continued)

FOREIGN PATENT DOCUMENTS

FR 2 295 876 7/1976  
FR 2885877 A1 * 11/2006  
(Continued)

OTHER PUBLICATIONS

U.S. Appl. No. 12/677,139, filed Mar. 9, 2010, Journade, et al.  
(Continued)

*Primary Examiner* — Ted Kim  
(74) *Attorney, Agent, or Firm* — Oblon, McClelland, Maier & Neustadt, L.L.P.

(57) ABSTRACT

An aircraft engine assembly including an attachment mechanism of a turbojet onto a rigid structure of a mounting strut, including a first, second, and third forward engine attachment for taking up thrust loads brought onto the fan frame, and arranged such that the third attachment passes through a first diametrical plane of the turbojet, the first and second attachments being disposed on one side and another of the first plane. The first and second forward engine attachments are respectively brought to the fan frame at two points, situated beyond the second diametrical plane of the turbojet, orthogonal to the first diametrical plane, with respect to the third attachment.

14 Claims, 13 Drawing Sheets

(56) References Cited

U.S. PATENT DOCUMENTS

| | | | |
|---|---|---|---|
| 3,398,535 A * | 8/1968 | Hemsworth et al. | 60/797 |
| 4,013,246 A | 3/1977 | Nightingale | |
| 4,266,741 A * | 5/1981 | Murphy | 244/54 |
| 5,226,288 A * | 7/1993 | Cornax | 60/797 |
| 5,259,183 A * | 11/1993 | Debeneix | 60/797 |
| 5,409,184 A | 4/1995 | Udall et al. | |
| 5,452,575 A * | 9/1995 | Freid | 60/797 |
| 5,860,275 A * | 1/1999 | Newton et al. | 60/797 |
| 7,445,179 B2 | 11/2008 | Diochon | 244/53 R |
| 7,448,573 B2 | 11/2008 | Lafont | 244/54 |
| 7,797,947 B2 | 9/2010 | Lafont | 60/796 |
| 7,971,825 B2 * | 7/2011 | Diochon et al. | 244/54 |
| 2008/0223983 A1 | 9/2008 | Lafont | 244/54 |
| 2008/0245926 A1 | 10/2008 | Journade | 244/54 |
| 2008/0251633 A1 | 10/2008 | Journade | 244/54 |
| 2008/0272229 A1 | 11/2008 | Lafont | 244/54 |

FOREIGN PATENT DOCUMENTS

| | | |
|---|---|---|
| FR | 2 900 907 | 11/2007 |
| GB | 2 275 308 | 8/1994 |

OTHER PUBLICATIONS

U.S. Appl. No. 12/918,334, filed Aug. 19, 2010, Journade, et al.
U.S. Appl. No. 12/918,530, filed Aug. 20, 2010, Journade, et al.

\* cited by examiner

ENGINE ASSEMBLY FOR AN AIRCRAFT COMPRISING ATTACHMENTS FOR ENGINES OFFSET BELOW ON THE FAN FRAME

The present invention generally relates to an aircraft engine assembly of a type comprising a turbojet, a nacelle enveloping the turbojet as well as a mounting strut provided with a rigid structure and a plurality of engine attachments interposed between a rigid structure of the mounting strut and the turbojet.

The mounting strut, also called EMS (Engine Mounting Structure), allows the turbojet to be suspended below the wing of the aircraft or even to mount the turbojet above the same wing or even to place it at the aft part of the fuselage. It is indeed designed to constitute a linking interface between a turbojet and a given structural part of the aircraft. It allows the loads generated by the associated turbojet to be transmitted to the structure of the aircraft and also allows the feeding through of the fuel, the electrical systems, hydraulics and air between the motor and the aircraft.

The nacelle is classically equipped with several cowls enveloping the turbojet and allowing access to the latter in the open position, these cowls being known under the denomination of fan cowls and inverse thrust cowls.

In more precise fashion, on certain engine assemblies in the prior art, a mounting strut having a rigid structure and comprising a longitudinal box is provided as well as two lateral boxes, solidly mounted on the longitudinal box and arranged on one side and another of same, the strut also comprising means of attaching the turbojet onto the rigid structure, these means having a first, second and third forward engine attachments to relay the thrust load onto the fan frame. As shown schematically in FIG. 1 illustrating an embodiment from the prior art in which the motor is intended to be suspended under the wing of the aircraft, the three forward engine attachments that take up the thrust load are arranged such that the third forward engine attachment (8) passes in the diametrical plane P1 of the turbojet, here the vertical symmetry plane of the turbojet, while the first and second engine attachments 6a, 6b, respectively intended to be carried on the two lateral boxes of the strut, are themselves arranged on one side and the other of the diametrical plane P1, and usually crossed by another diametrical plane P2 of the turbojet, orthogonal to the aforesaid diametrical plane and corresponding here to the horizontal plane of symmetry of the turbojet. It is noted that this particular arrangement, in which the anchoring points of the first and second engine attachments on the fan frame are diametrically opposed on the latter, is held so as to privilege the passage of the thrust loads by these two attachments, the loads transiting by the third attachment being much weaker, if not zero. This allows one to avoid creating a drift of the privileged plane of the take up of the thrust loads constituted by these two diametrically opposite attachments, with respect to the engine axis, and therefore strongly limits the introduction of a reputed harmful torque, susceptible to exert itself along the transversal axis of the turbojet and to deform the engine housing.

The turbojet comprises in a classic fashion, a fan frame 12, an intermediate casing 21 situated radially to the interior with respect to the fan frame and connected to the latter by a plurality of structural arms 17, preferably oriented radially, as well as a central casing 16, also called the "core" casing, extending the intermediate casing 21 towards the rear. Finally, it is noted that the central casing extends right up to the rear extremity 19 of the largest dimension, also called the turbine exhaust case.

The three engine attachments 6a, 6b, 8 being rigidly attached to the fan frame 12, and more preferentially to a rear peripheral end 18 of said fan frame, this casing 12 is therefore stressed when there is an axial thrust generated by the turbojet, the same way as the structural arms 17. During such a stressing, the fan frame is completely capable of transmitting the axial loads, also called longitudinal loads, even into the parts of the casing situated between two structural arms that are directly consecutive in the circumferential direction.

However, it has been noted than in the privileged plane P2 taking up the thrust loads, the structural arms undergo large tensions that caused them to flex which is harmful for the engine. Indeed, as illustrated schematically in FIG. 2a, in the diametrical plane P2 which integrates the engine attachments 6a, 6b which take up most of the thrust loads, the structural arms 17 have a tendency to flex, and their radial outside ends are thrust towards the rear. This flexing of the arms 17 towards the rear is at the origin of a deformation of the fan frame 12, which has a tendency to "open up" as indicated by the separation of the peripheral forward end 23, with respect to the engine axis 5, in the plane P2. In order to compensate for this opening, the forward peripheral end 23 has a tendency to "close up" or to "squeeze>>" into the diametrical orthogonal plane P1, hence this generally resorts to an "ovalizing" of the casing, with the long axis being that passing through the first and second engine attachments 6a, 6b.

Thus, the deformation of the fan frame, described above, creates large plays between the end of the fan blades and this same casing, plays that are reputed to be harmful to the global performance of the engine.

As mentioned above, the thrust loads passing in a privileged fashion through the first and second engine attachments in the plane P2, the third engine attachment being therefore stressed at much weaker levels of intensity, if not zero. However, this third engine attachment blocks any displacement of the engine while running. Because of this blocking, a deformation of the casing in the plane P1, with respect to the strut appears, through a rotation of the engine assembly around this third attachment.

In the case described above, the rotation of the attachment 8 has a tendency to pivot the rear part of the turbojet towards the bottom, as indicated in FIG. 2B, in which the level of deformation has intentionally been exaggerated for reasons of clarity, as is also the case in FIG. 2a.

In a more general manner, the deformation undergone by the turbojet, and therefore of the central casing 16, causes a displacement of the rear end of said turbojet in a direction opposite to that where the third engine attachment is found.

In this regard, it is noted that the displacement of the central casing can prove to be problematic with regard to the integration of same into the rear part of the strut and/or of the nacelle.

The scope of the invention is therefore, that of proposing an aircraft engine assembly that solves, at least partially, these problems mentioned above, compared to embodiments in the previous art.

In order to do this, the invention has for object an aircraft engine assembly comprising:

a turbojet comprising a fan frame, an intermediate casing situated radially to the interior with respect to the fan frame and connected to the latter by a plurality of structural arms, preferably oriented radially, as well as a central casing extending said intermediate casing towards the rear;

a mounting strut with a rigid structure comprising a longitudinal box as well as two lateral boxes integrated with said longitudinal box and arranged on one side and another of same, the strut also comprising means of mounting said turbojet onto the rigid structure, said means of mounting comprising first, second and third forward engine attachments to take up the thrust loads brought to the fan frame, and arranged such that said third forward engine attachment passes through the first diametrical plane of the turbojet, said first and second forward engine attachments, respectively carried on the two lateral boxes, being arranged on one side or another of this first diametrical plane.

According to the invention, said first and second forward engine attachments are brought to the fan frame at two points, respectively situated beyond the second diametrical plane of the turbojet, orthogonal to the first diametrical plane, with respect to said third forward engine attachment.

The originality of the invention resides in moving the first and second engine attachments with respect to their previously adopted diametrical position, the move being performed so as to move away from said third engine attachment. With such a configuration, when there is an axial thrust of the turbojet, a movement is observed with respect to the engine axis, the plane of take-up for the thrust loads integrating the first and second engine attachments. Thus, because of the adopted displacement, the take-up plane is less privileged which was not the case in the previous solutions described above, such that the thrust loads are repartitioned in a more homogeneous fashion through the three specified engine attachments. In other terms, the third engine attachment crossed by the diametrical plane, is more stressed, since same takes up greater thrust loads. This advantageously results in a lowering of the stresses in the structural arms situated in and close to the second diametrical plane, and, in a more general manner, in a substantial homogeneity of the stresses in all of the structural arms surrounding the intermediate casing. As a consequence, the fan frame becomes itself more homogeneously stressed in its periphery, which strongly limits the "ovalizing" effect encountered in the previous art with the first and second engine attachments diametrically opposite. This translates in a higher efficiency of the fan and therefore in a higher global efficiency for the turbojet.

In addition, the lessening of the deformation of the fan frame and of the structural arms induces in turn a lessening of the vertical displacement of the fan frame with respect to the strut. This results in the limiting of the displacement of the central casing, that can better integrate with the rear part of the strut and/or of the nacelle.

Naturally, the positioning of the first and second engine attachments under the second diametrical plane can be adjusted according to the design of the associated engine assembly; this positioning can therefore evolve according to the aircraft involved.

Preferably, said first and second forward engine attachments for taking up the thrust loads, are symmetrically situated with respect to said first diametrical plane defined by the longitudinal axis of the turbojet parallel to a longitudinal direction of same, and a first direction of said turbojet orthogonal to the longitudinal direction.

Always preferentially, with a head-on view along the longitudinal axis of the turbojet, the angle having as center the longitudinal axis of the turbojet, between the anchoring points of the third and the first engine attachment should strictly be greater than 90° and less than or equal to 120°, and even more preferentially be between, but not including, 90 and 110°, or even between but not including, 90 and 100°, and the angle having as center, the longitudinal axis of the turbojet, between the anchoring points of the third and the second engine mount, should be greater or equal to 240° and strictly less than 270°, and again more preferentially be between but not including, 250 and 270°, or even between but not including, 260 and 270°. The most preferential intervals allow a very satisfactory solution to be obtained, in which the implantation of the first and second attachments is not problematic at all, and in which the turbojet offers satisfying performances.

Preferably, said first and second forward engine attachments are each designed for taking up the loads in the longitudinal direction and according to said first direction of the turbojet, and said third forward engine attachment is designed for taking up the loads exerted along the longitudinal direction and along a second direction of the turbojet, orthogonal to said first direction and to the longitudinal direction.

For information only, it is noted that in the case where the turbojet is intended to be mounted above the wing of the aircraft, or suspended below said wing, the first and second mutually orthogonal directions and orthogonal to the longitudinal direction, are preferentially the vertical and transverse directions of the turbojet, respectively. On the other hand, while that could also be the case in the framework of mounting the engine assembly onto the aft part of the aircraft fuselage, it could be that the first and second directions are each inclined with respect to the vertical and transverse directions of the turbojet.

In this configuration, said means of mounting are uniquely constituted of the specified forward attachments, attached to the fan frame of the turbojet, forming an isostatic take-up system. More generally, one arranges that the only means of mounting attached to the fan frame are said first, second and third engine attachments, even in other cases where an additional engine attachment is provided between the rigid structure of the strut and the central casing, still so as to form an isostatic take-up.

Preferably, as mentioned above, said first direction of the turbojet corresponds to a vertical direction of same, and said second direction of the turbojet corresponds to a transverse direction of same.

Preferably, the external enclosing skin of the box of each of the two lateral boxes constitutes a part of the external aerodynamic surface of the nacelle. In other terms, this comes back to foreseeing that a part of the external aerodynamic surface of the nacelle is constituted by working skins, susceptible to take up the loads coming from the turbojet. Besides, in providing preferentially one or several nacelle cowls mounted on the lateral boxes, it is then advantageously possible to form an envelope right around a given part of the turbojet, with the aid of the aforesaid elements.

According to another preferred embodiment, the engine assembly comprises in addition an annular structure for transferring loads around the central casing and linked mechanically to the latter by intermediary of the means of attaching, and, to each of said first and second forward engine attachments is associated a reinforcing structure forming a shearing plane, rigidly attached:

at the level of the annular structure in a first anchoring point;

at the level of the fan frame in a second anchoring point; and at the level of the structural arm or the intermediate casing in a third anchoring point, said structure lying along an imaginary plane, preferably radial, parallel to a longitudinal axis of said turbojet or passing through said plane, and also passing through the anchoring point of said forward engine attachment on the fan frame.

First of all, the presence of these reinforcing structures stressed during shearing, allows the turbojet to be braced in the two specified imaginary planes, involving a limitation of the flexing of the central casing and of the intermediate casing, even in the case of inertial stresses in these planes. The global performances of the engine assembly are improved.

In addition, this addition of reinforcing structures produces a bracing of the structural arms in and close to the two aforesaid imaginary planes, which is where the arms are traditionally the most stressed. As a consequence, the fan frame being rigidly linked to these arms, this limits even more the ovalization effect described above. This translates in a better fan efficiency, and therefore in a better global efficiency of the turbojet.

Preferably, said third anchoring point is situated at the level of the junction between said intermediate casing and a structural arm, even if it could be placed on one or another of these elements, without departing from the scope of the invention.

Preferably, each reinforcing structure takes the general form of a triangle, full or pierced to save on mass. In this regard, the triangular form appears to be suitable for the formation of a shearing plane.

Still preferably, said third forward engine attachment is associated with a reinforcing structure forming a shearing plane, rigidly connected:
  at the level of the annular structure in a first anchoring point;
  at the level of the fan frame in a second anchoring point; and
  at the level of the structural arm or the intermediate casing in a third anchoring point, said structure lying along an imaginary plane, preferably substantially radial, parallel to the longitudinal axis of said turbojet or passing through same, and also passing through the anchoring point of said third forward engine attachment on the fan frame.

With this configuration, in which the imaginary plane concerned preferably corresponds to the first aforesaid diametrical plane, the central casing is more braced, and better able to resist the inertial forces applied in this plane.

Still preferably, said reinforcing structures are without any direct mechanical link with said strut, which allows avoiding the introduction of additional loads in the latter. The aforesaid means of attaching can remain isostatic for this reason, despite the presence of the reinforcing structures. For information only, for identical reasons, one also arranges that said reinforcing structures are without any direct mechanical connection with the nacelle of the concerned engine assembly.

In addition, the invention can comprise an annular structure for transferring the loads surrounding the central casing and linked mechanically to the latter via means of attaching comprising a plurality of connecting struts, said annular structure being in addition, connected to a plurality of structures arranged externally with respect to same, as for example the reinforcing structures described above, these structures stressing radially same in a plurality of load introduction points spread circumferentially on the latter.

In such a case, at least one connecting strut is associated to each of the load introduction points, said strut being, in head-on view along a longitudinal axis of the turbojet, disposed tangentially with respect to the central casing, and having an internal end attached to this central casing, as well as an external end connected to said annular structure so as to be crossed by an imaginary plane passing through the longitudinal axis of said turbojet, and equally through said point of introduction of loads.

Alternatively, the structures can be non radial, but more generally substantially flat, preferentially parallel to the longitudinal axis of the turbojet, however, each remaining always integrated into the imaginary plane passing through said point of introduction of loads and the external end of the associated strut.

Each configuration has the advantage of placing, in a head-on view, each point of introduction of loads and the external ends of the connecting strut in the same imaginary plane, therefore preferably radial, in which the radial load introduced in the annular structure, is also arranged, by the outside structure associated with the concerned point of introduction of loads. In consequence, the aforesaid radial load is taken up together by a compression load or by a traction load in the strut, as well as by the necessarily substantially tangential load in the annular structure, equally called the membrane load. For this reason, at the level of each of the points of introduction of loads of the annular structure, this load tends to respond to the mechanical stresses of the exterior structures by a substantially tangential load, strongly limiting the deformations of same and preventing same in particular from "ovalizing".

In addition, the connecting struts disposed tangentially with respect to the central casing on which they are attached, the deformations of this casing are also strongly limited.

This configuration globally foresees therefore to provide a better optimized mechanical junction between the annular structure and the central casing, ensuring a satisfactory take-up of the loads transiting through the exterior structures connected to the annular structure.

Preferably, said connecting struts all extend in the same circumferential direction from their outside end. With this configuration, in the case of a thermal differential dilatation between the ring and the casing or the struts, the ring can advantageously turn around the central casing, while still staying co-axial with said casing.

Preferably, said connecting struts are substantially disposed in the same transverse plane of the turbojet.

Still preferentially, in order to optimally authorize the thermal dilatation of the central casing with respect to the annular structure that surrounds same, said struts have inner and outer ends attached by ball-joints.

Preferably, as previously mentioned, the outer structures are constituted by reinforcing structures described above. Thus, to each said first, second and third forward engine attachment is associated a reinforcing structure forming a shearing plane, rigidly connected:
  at the level of the annular structure at a first anchoring point forming a point of introduction of load in said annular structure;
  at the level of the fan frame and in a second anchoring point, and
  at the level of the structural arm or the intermediate casing in a third anchoring point, said reinforcing structure extending therefore along said imaginary radial plane passing through said point of introduction of load, and also through an anchoring point of said forward engine attachment on the fan frame.

It is noted that the reinforcing structures forming a shearing plane, perfectly play their role due to the non-deformation, mentioned above, of the annular structure onto which same is attached, via the points of introduction of loads.

Another subject matter of the present invention concerns an aircraft comprising at least one engine assembly such as described above, assembled on a wing or on a rear part of the fuselage of this aircraft.

Other advantages and features of the invention appear in the non-limiting detailed description below.

This description will be given with regard to the attached drawings among which;

FIGS. 1 to 2b, already described, show the aircraft engine assembly in accordance with the prior art;

Figure 3:
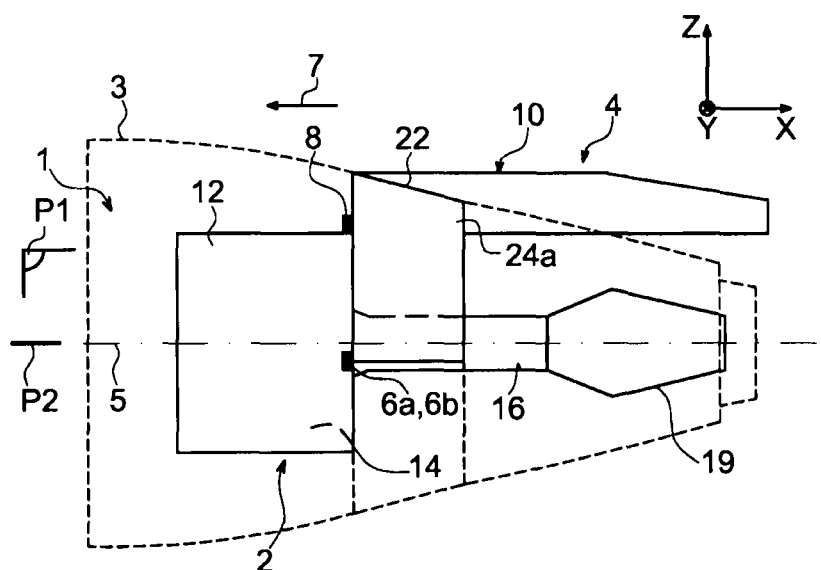
FIG. 3 shows a side view of the aircraft engine assembly, according to a preferred embodiment of the present invention.

With reference to FIG. 3, an aircraft engine assembly 1 is seen, according to a preferred embodiment of the present invention, this assembly 1 being intended to be attached under an aircraft wing (not shown).

Globally, the engine assembly 1, also called the integrated propulsion system, is composed of a turbojet 2, a nacelle 3 (shown dotted for reasons of clarity) and a mounting strut 4 equipped with the means of attaching of the turbojet onto the strut, said means being preferably constituted of a plurality of engine attachments 6a, 6b, 8, rigidly attached to a rigid structure 10 of the mounting strut (the attachment 6b being masked by attachment 6a in this FIG. 3). For information only, it is noted that the assembly 1 comprises another series of mounts (not shown) for ensuring the suspension of this assembly 1 below the aircraft wing.

In the whole description that follows, by convention, one calls X the longitudinal direction of the strut 4 which can also be assimilated with the longitudinal direction of the turbojet 2, said direction X being parallel to the longitudinal axis 5 of the turbojet 2. On the other hand, one calls Y the direction oriented transversely with respect to the strut 4 and can also be assimilated with the transverse direction of the turbojet 2, and Z being the vertical direction or height, these three dimensions X, Y and Z being mutually orthogonal.

On the other hand, the terms "forward" and "rear" are to be considered with respect to the direction of forward travel of the aircraft met following the exertion of thrust by the turbojet 2, this direction being represented schematically by the arrow 7.

In FIG. 3, it can be seen that only the engine attachments 6a, 6b, 8 and the rigid structure 10 of the mounting strut 4 have been shown. The other not shown constituting elements of said strut 4, such as the means of attaching of the rigid structure 10 under the wing of the aircraft, or again the secondary structure ensuring the segregation and holding of the systems, while supporting the aerodynamic shrouds, are classic elements identical or similar to same encountered in the prior art and known to a person skilled in the art. Consequently, no detailed description of said elements will be given.

Figure 1:
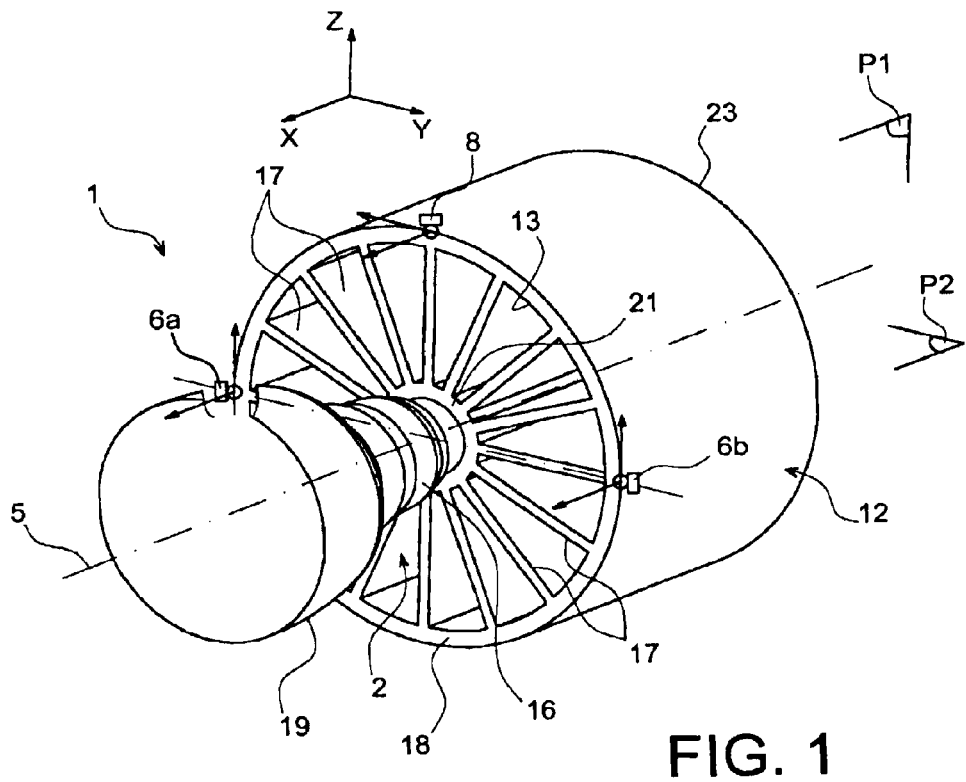
Figure 2A:
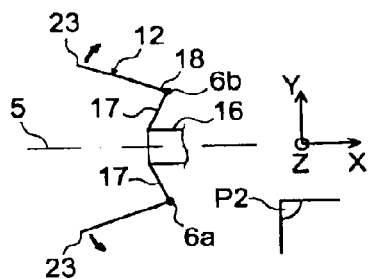
Figure 2B:
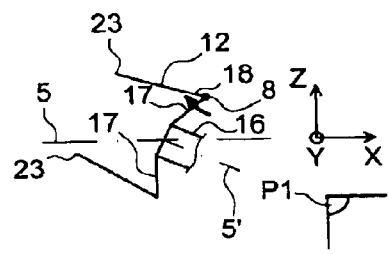

On the other hand, the turbojet 2 disposes of an identical or similar design to that shown in FIG. 1, namely comprising at the front a fan frame 12 of large size delimiting an annular fan channel 14, an intermediate casing 21 and structural arms 17 (not shown in FIG. 3), also known as outlet guide vanes, as well as a central casing 16 having a rear end 19.

As follows from the preceding part, it concerns here preferably a turbojet having a high bypass ratio.

As can be seen in FIG. 3, a first forward engine attachment 6a as well as a second forward engine attachment 6b are both intended to be attached to the fan frame 12, symmetrically with respect to the plane P1 called the first diametrical plane defined by the axis 5 and the Z direction, this vertical plane P1 crossing a third forward engine attachment 8 also attached to the fan frame 12, all three attachments being preferably crossed by a plane orthogonal to axis 5.

Figure 4:
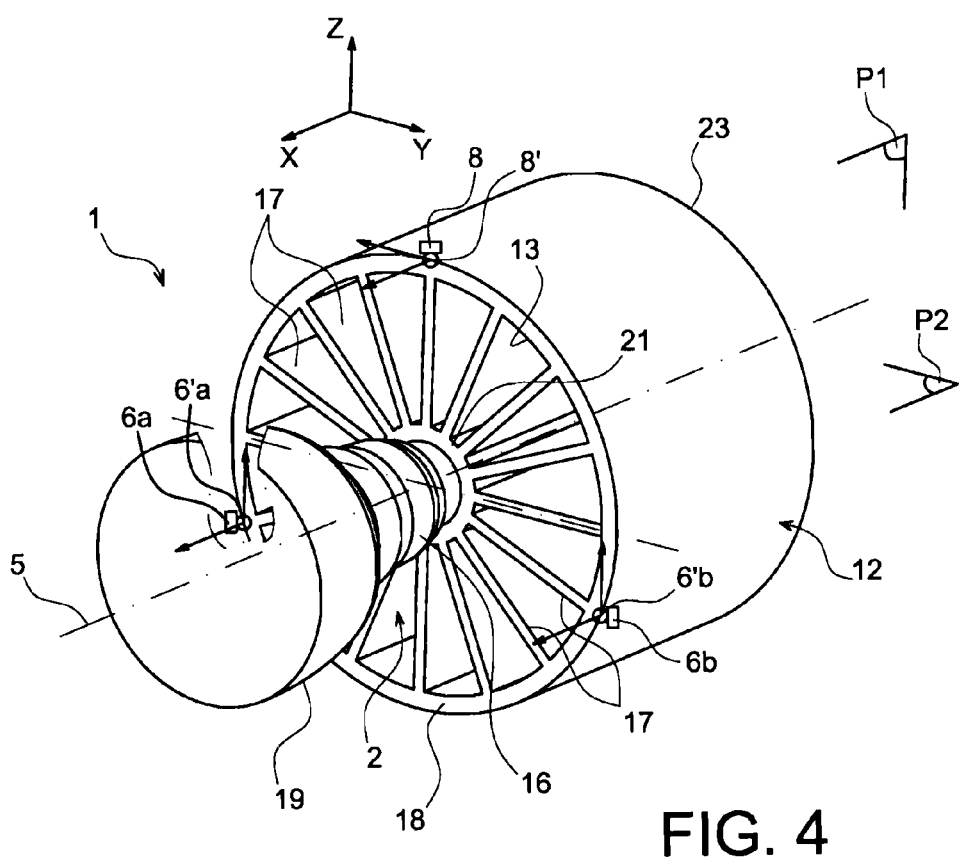
FIG. 4 shows a perspective view of the assembly shown in FIG. 3, the rigid structure of the mounting strut and the nacelle having been withdrawn to allow the engine attachments to be more clearly seen.
Figure 5:
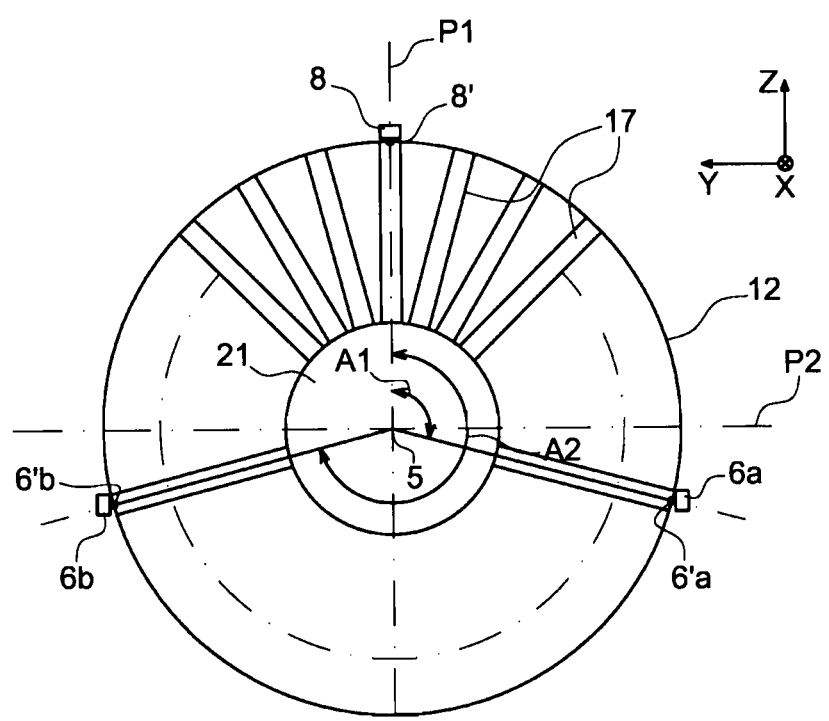
FIG. 5 shows a schematic head-on view corresponding to same in FIG. 4, illustrating the particular positioning of the engine attachments.

In reference now to FIG. 4, it can be seen that the first attachment 6a and the second attachment 6b shown schematically, are indeed symmetrically arranged with respect to the first diametrical plane P1 of the turbojet, and preferably both arranged on the peripheral annular part of the fan frame 12 and more precisely on the rear of this same part. More precisely, same are arranged under a plane P2 called the second diametrical plane of the turbojet, which is orthogonal to the first, and therefore horizontal. The two attaching points 6'a and 6'b of these attachments 6a, 6b onto the casing 12 are therefore situated so that the second plane P2 is situated between these two points 6'a and 6'b, and the attachment point 8' of the engine attachment 8 on this same casing, in a head-on view along the axis 5, like that shown in FIG. 5.

In this figure showing a view along the axis 5, it is seen that an angle A1 having as center this horizontal axis 5, between the anchoring points 8' and 6'a of the third and first engine attachment, is strictly greater than 90° and preferably between but not including 90 and 110°. Equivalently, an angle A2 having as center said longitudinal axis 5, between the anchoring points 8' and 6'b of the third and second engine attachment, is strictly less than 270° and preferably between but not including 250 and 270°.

As mentioned above, this arrangement of the attachments 6a, 6b allows the engine attachment 8 to be more stressed, and therefore limits the parasitic effects of "ovalization" of the fan frame, which are encountered in the embodiments in the prior art. In addition, same allows the torque of the axis parallel to the Y direction, exerting on the turbojet, resulting from the axial loads crossing through the same third attachment 8, to be countered/compensated.

For information only, it is noted that the engine attachments 6a, 6b, 8 are made in a conventional manner, for example of a type integrating fittings and pins, the aforesaid anchoring/attaching points 6'a, 6'b, 8 corresponding to the points of contact between the structure of said attachments and the structure of the fan frame.

As shown schematically by the arrows in FIG. 4, each of the first and second forward engine attachments 6a, 6b is designed for taking up the loads generated by the turbojet 2 along the X direction and along the Z direction, but not the loads exerting along the Y direction.

In this manner, the two attachments 6a, 6b, distanced one from the other, jointly ensure the take-up of the moment exerting along the X direction, and that of the moment exerting along the Z direction. Still with reference to FIG. 4, it is seen that the third forward attachment 8, situated on the highest part of the fan frame 12, therefore on the highest part of the annular peripheral part, is designed so that the loads generated by the turbojet 2 along the X direction and along the Y direction, but not those exerting along the Z direction, are taken up. In this manner, said third attachment jointly ensures, with the attachments 6a, 6, the take-up of the moment exerting along the Y direction.

The advantage of this non-limiting configuration lies in the fact that all of the engine attachments are attached on the fan frame, such that the bypass flow is in no way perturbed by these attachments, thus leading to a significant increase in the global performances of the engine. In addition, the three attachments together form an isostatic take-up system.

Figure 6:
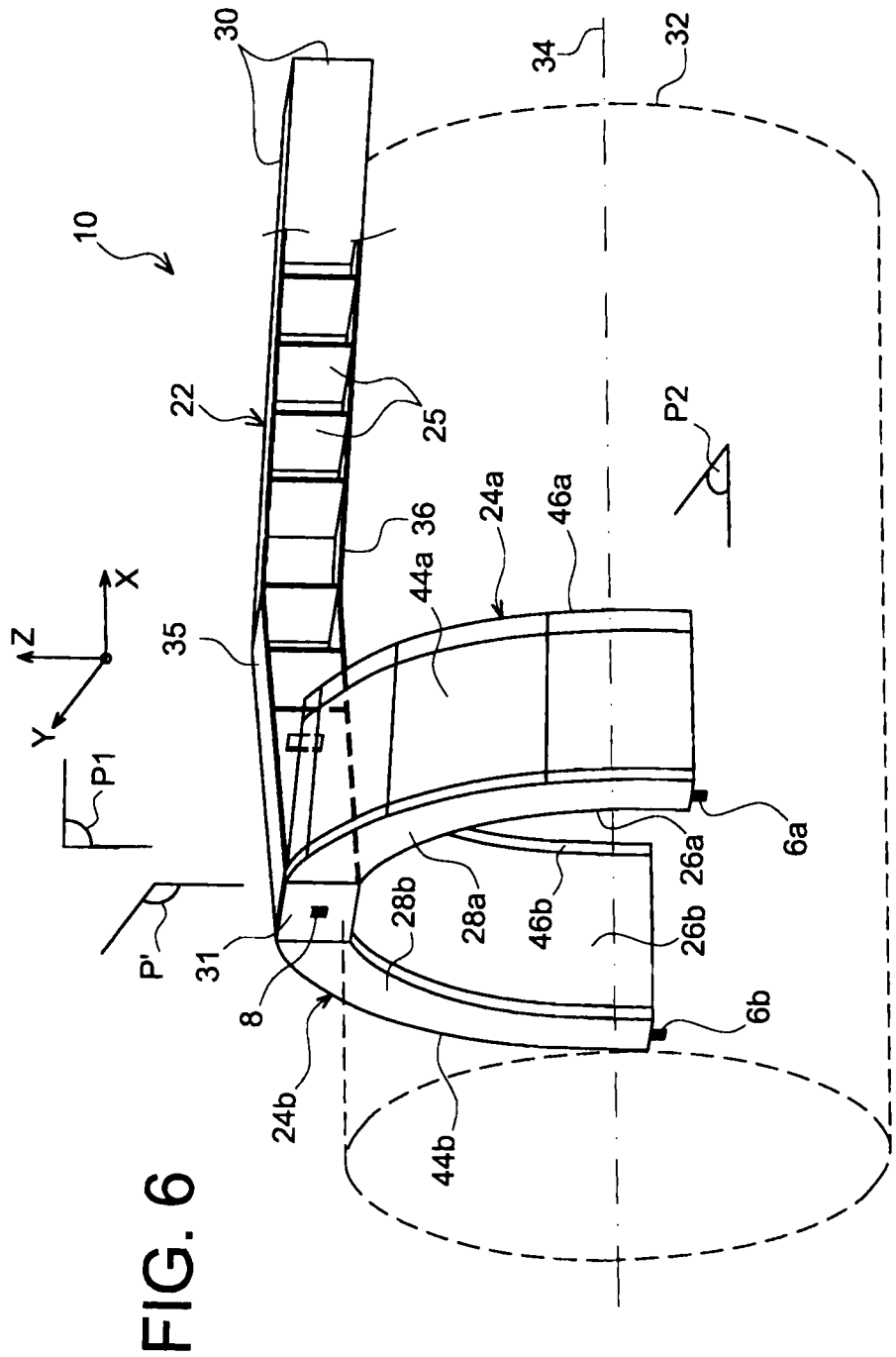
FIG. 6 shows a partial, enlarged view of the mounting strut according to the preferred embodiment.

With reference now to FIG. 6, an example of an embodiment of the rigid structure 10 of the mounting strut 4 is seen. Firstly, it is indicated that this rigid structure 10, also called the primary structure, is preferably designed so that it is be symmetrical with respect to the diametrical plane P1 indicated above, meaning with respect to the vertical plane defined by the axis 5 of the turbojet 2, and the Z direction. For information only, this is generally the case when the engine is suspended or mounted above the wing, but not necessarily when it is assembled at the rear of the fuselage. Indeed, in the latter case which will be detailed in reference to FIGS. 8 and 9, the rigid structure 10 can have another plane of symmetry depending upon the orientation of same with respect to the rear of the fuselage, e.g., a plane of symmetry substantially horizontal or inclined with respect to the horizontal, or even without any plane of symmetry. This is found namely when the two lateral casings that will be described later, attached or arranged on one side or another of a longitudinal casing called the central casing, do not have the same circumferential length.

Thus, the rigid structure 10 comprises a longitudinal casing 22, called the central longitudinal casing, and also called the torque box, which extends from one end to the other of the structure 10 in the X direction, parallel to this same direction. For information only, the box 22 can be formed by assembling two spars or lateral panels 30 extending along the X direction in the parallel planes XZ, and linked between them via transverse ribs 25 which are oriented in the parallel planes YZ. In addition, an upper spar 35 and a lower spar 36 are also provided for closing the box 22.

Two lateral boxes 24a, 24b are going to complete the rigid structure 10 of which the central box 22 is situated at the level of the upper portion of said structure 10, each of the two boxes 24a, 24b being integral with the central torque box 22 and protruding from one side and from the other of said torque box along the Y direction, and towards the bottom. For information only, it is noted that boxes 22, 24a, 24b can be made so as to form a single and unique box, without departing from the scope of the invention.

Preferably, said lateral boxes attached integrally on one side and on the other at the front of the central box 22, each having an internal skin for closing the box 26a, 26b, also called the lower skin, oriented towards the turbojet and jointly delimiting a part of the imaginary surface 32, substantially cylindrical with circular cross section, and with a longitudinal axis 34 parallel to the central box 22 and to the X direction, as seen in FIG. 6.

In other terms, said two skins 26a, 26b each have at least one part with a suitable curvature to be able to be positioned around and in contact with this imaginary surface 32. It is foreseen to be advantageous that said skins 26a, 26b then participate in the external radial delimitation of an annular bypass air channel (not shown), knowing that it can also be considered to provide an acoustical protection coating on the same closing skins, indifferent as to being on the inside or the outside. Alternatively, it is possible to arrange so that the two lateral boxes are entirely situated above the fan frame, without departing from the scope of the invention.

For information only, it is specified that the axis 34 is preferably merged with the longitudinal axis 5 of the turbofan 2.

In addition, the lateral box 24a, here identical and symmetrical with the lateral box 24b, comprises an external box closing skin 44a, while the lateral box 24a comprises also an external box closing skin 44b.

The external closing skins 44a, 44b, also called upper skins, each preferably constitute a part of the external aerodynamic surface of the nacelle, with the advantageous result that at least one part of the strut is an integral part of the nacelle.

Figure 7:
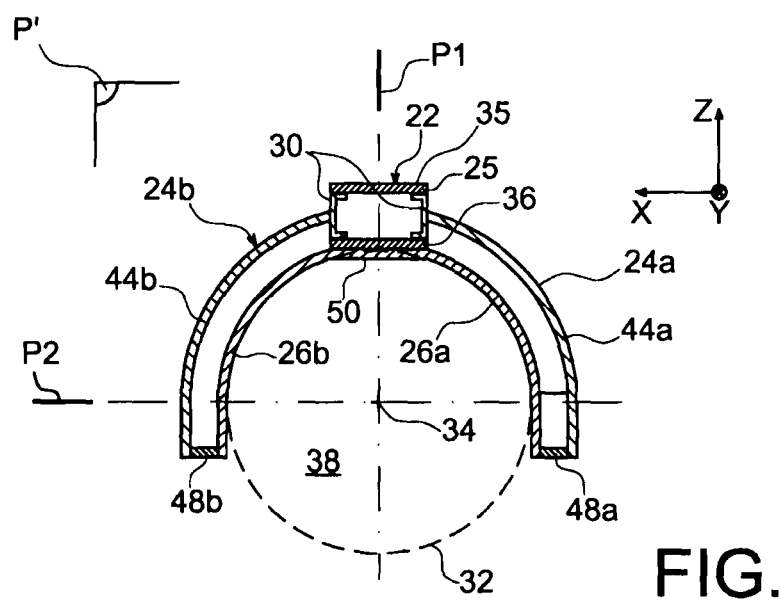
FIG. 7 shows a cross-section view taken along the transverse plane P' of FIG. 6.

FIG. 7 shows a cross-section view taken along a transverse plane P' crossing in some manner the lateral boxes 24a, 24b.

In this figure, it is seen that the two external closing skins for the box 26a, 26b delimit with one part of their external surface, a part of the imaginary surface 32, substantially cylindrical with a circular cross section. It is noted that in order to create the minimum perturbation of the bypass air in the annular channel of the fan 14, the diameter of the imaginary cylindrical surface 32 is preferably substantially identical to the diameter of the external cylindrical surface of the annular part of the fan frame 12. This specificity of course is in accord with the specificity aiming to foresee that the skins 26a, 26b participate in the external radial delimitation of the bypass air annular channel.

In addition, as can be seen in FIG. 7, the elements of the central box 22 do not protrude a large distance into the interior of the space 38 delimited by the imaginary surface 32, so that they do not either significantly perturb the flow of the bypass air. This is explained namely by the fact that the lateral spars 30 have a height in the Z direction that is extremely small with respect to the diameter of the imaginary surface 32 and external surface 18.

In joint reference to FIGS. 6 and 7, the skins 26a, 44a are attached one to the other via a forward closing frame 28a and a rear closing frame 46a, these frames 28a, 46a being therefore oriented transversely and situated forward and rear respectively of the box 24a. In addition, a closing plate 48a situated below the plane P2 is going to close the lower part of the box 24a, and therefore links the lower end of the frames 28a, 46a and of the skins 26a, 44a.

Naturally, the lateral box 24b comprises elements 26b, 44b, 28b, 46b and 48b, respectively identical with elements 26a, 44a, 28a, 46a and 48a of the box 24a, these two boxes being for example, susceptible to carry, preferably in an articulated manner, the cowls of the nacelle.

The two skins 26a and 26b are preferably conceived all in one piece and linked between them at the level of the upper part of said skins via a junction plate 50 oriented along the plane XY and situated in contact with the lower spar 36 of the central box 22. Similarly, it could also be foreseen that the two forward closing frames 28a, 28b are conceived all in one piece and linked between them at the level of the upper part of said frames via a forward closing frame 31 of the box 22, this frame 31 being oriented along the plane YZ. Consequently, in this configuration, the frames 28a, 28b, 31 made of a single piece are therefore arranged in the same plane YZ, and constitute an end forward of the rigid structure 10 of the strut 4.

Thus, the rigid structure 10 of the mounting strut 4 is very well adapted for supporting the forward engine attachments 6a, 6b, 8 since said engine attachments can easily be attached onto the transverse part made of one piece integrating the frames 28a, 28b and 31, as shown in FIG. 1, and having, e.g., a general U-shape, just like the assembly of the rigid structure in a head-on view.

An alternative solution could be considered, in which the lateral boxes form a semi-cylindrical barrel and not a U shape, the additional structural elements being then provided under the boxes, in order to displace the first and second engine attachments under the second diametrical plane P2. This configuration is particularly interesting in the case of the installing of the turbojet on the strut by a vertical movement, from below.

For information only, all of the elements constituting the rigid structure 10 which was described are fabricated using metallic materials, such as steel, aluminum, titanium, or again using composite materials, preferably of carbon.

It is recalled that if the lateral boxes 24a, 24b can indeed have a different circumference, mainly in the case of attaching the assembly to the rear part of the fuselage, it is also specified that in this latter case, the boxes can be attached to the central box 22 at another position than the forward part of said central box, without departing from the scope of the invention.

Figure 8:
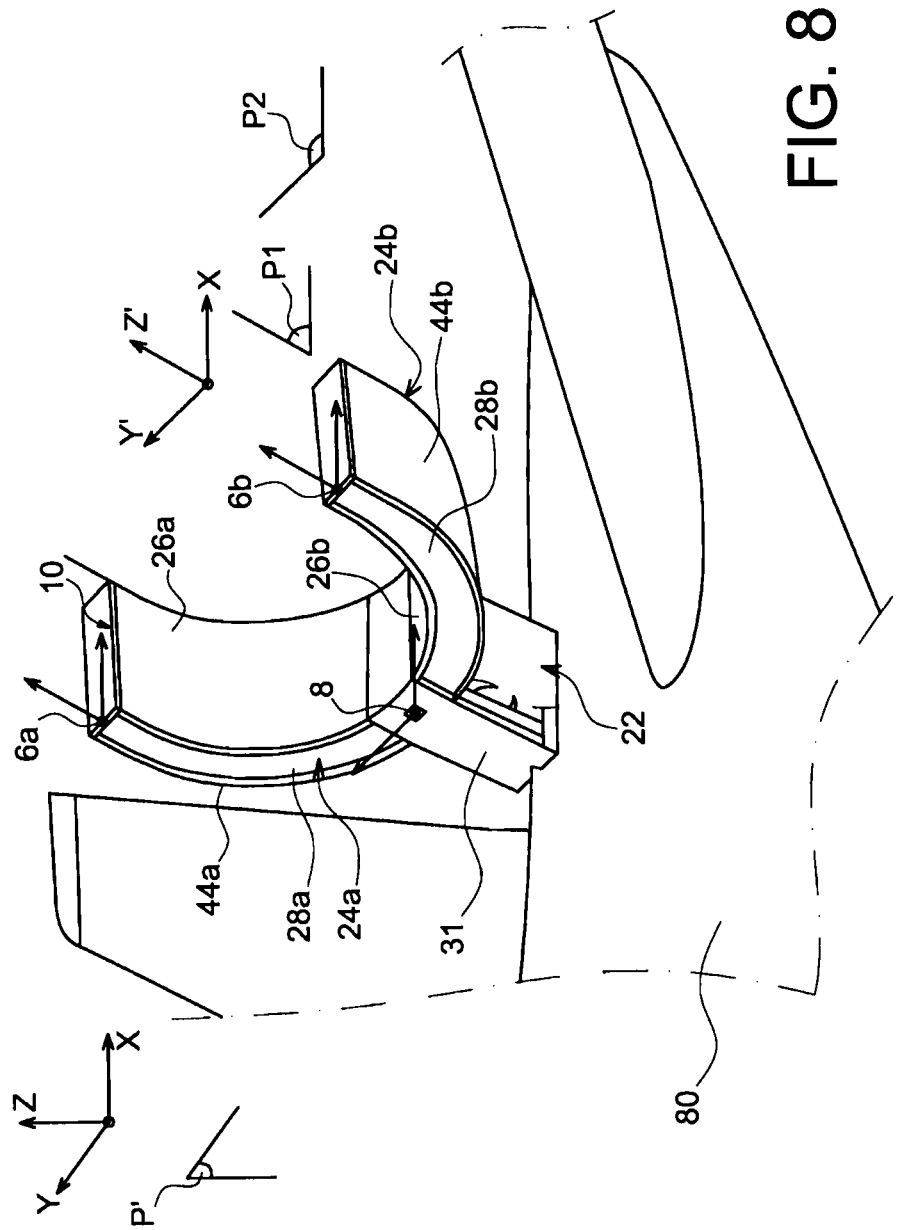
FIG. 8 shows a perspective view of the aircraft engine assembly, belonging to an aircraft engine assembly according to a preferred embodiment of the present invention.
Figure 9:
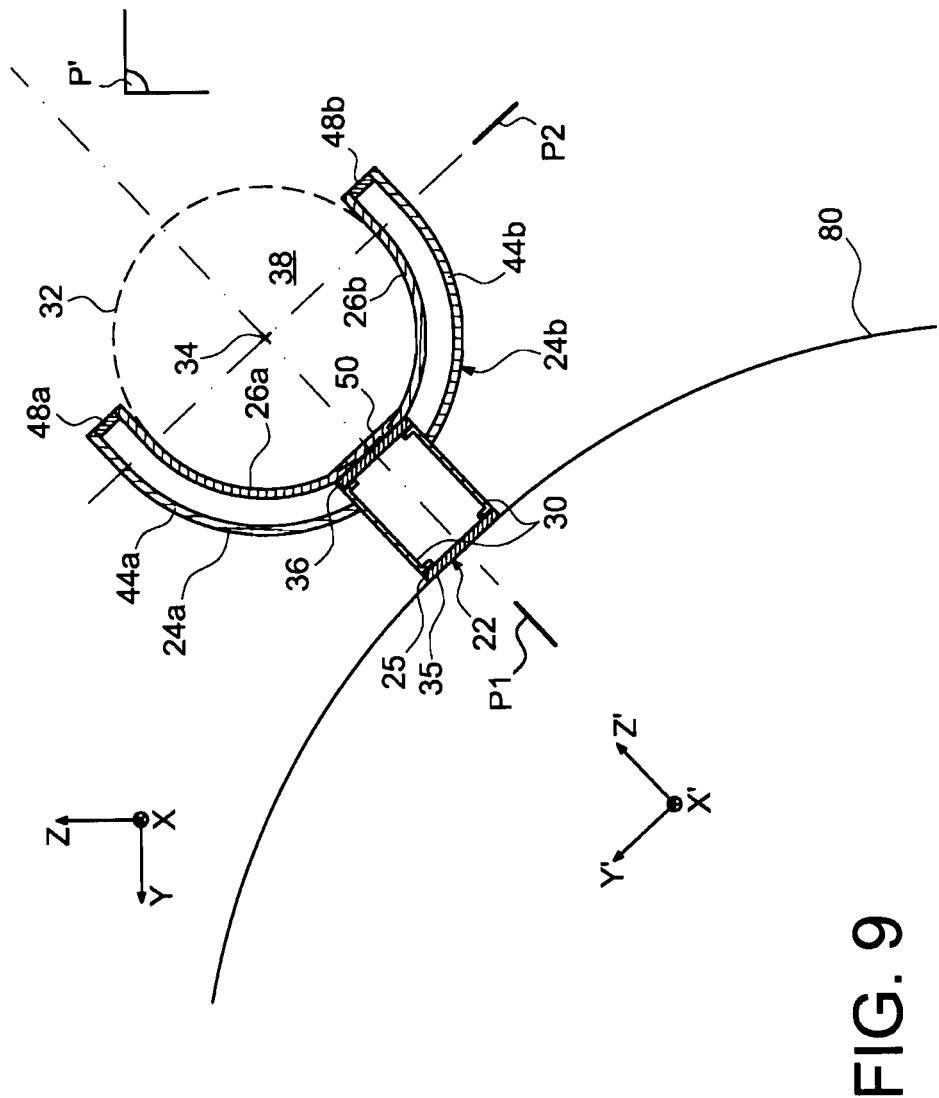
FIG. 9 shows a cross-section view taken along the transverse plane P' of FIG. 8, crossing the rigid structure of the mounting strut.

In this regard, with reference here to FIGS. 8 and 9, the rigid structure 10 of the mounting strut belonging to the engine assembly is seen according to another preferable embodiment of the present invention, whose particularity is to be destined to be brought to the aft part of the aircraft fuselage 80.

This rigid structure 10 has a substantially identical design to that described in the embodiment described above, as testified by the reference numbers corresponding to identical or similar elements to same previously described.

It can be seen that the main difference, resulting from attaching to the aft part of the fuselage 80, resides in the inclining of said rigid structure 10, insofar the two lateral boxes 24a, 24b now form together a portion of the substantially cylindrical envelope/cage that is no longer situated around an upper half-diameter, but arranged around a substantially lateral half-diameter of said same turbojet (not shown).

More precisely, the rigid structure 10 is preferably designed so as to be symmetrical with respect to the diametrical plane P1 which is no longer vertical, but defined by the longitudinal axis 5 of the turbojet 2 and a first direction Z' orthogonal to the X direction, this first Z' direction being inclined with respect to the aforesaid Z and Y directions, respectively corresponding to the vertical and transverse directions of the turbojet. Preferably, said plane P1 can be such that it rises up while moving away from the fuselage 80, by an angle, e.g., comprised between about 10° and 60° with respect to the horizontal, that is with respect to any XY plane.

The first forward engine attachment 6a and the second forward engine attachment 6b are both intended to be attached to the fan frame, in a symmetrical fashion with respect to the plane P1 described above, as shown in FIG. 8.

It is then foreseen that the first and second forward engine attachments 6a, 6b are disposed beyond the diametrical plane P2, orthogonal to P1, opposite to attachment 8. Here again, this is summarized by the fact that the diametrical plane P2 is situated between the two attachments 6a, 6b, and the engine mount 8.

Here, the plane P2 is defined by the horizontal axis 5 and a second direction Y' orthogonal to the direction X and to the first direction Z', such that it is therefore also inclined with respect to the Z and Y directions.

As shown schematically by the arrows in FIG. 8, each of the first and second forward engine attachments 6a,6b is designed for taking up the loads generated by the turbojet 2 along the X direction and along the first Z' direction, but not same exerting along the Y' direction.

In this manner, the two attachments 6a, 6b are greatly separated from one another, jointly ensuring the take-up of the moment exerting along the direction X, and the take-up of the moment exerting along the direction Z'.

Still with reference to FIG. 8, a third forward engine attachment 8 can be seen, shown schematically and also intended to be attached to the peripheral annular part of the fan frame (not shown), also preferably at the rear of said part. Concerning this third forward engine attachment 8, crossed in an imaginary fashion by the plane P1 indicated above, it is designed in such a manner as to be capable of taking up uniquely the loads generated by the turbojet 2 along the X direction and along the Y' direction, and therefore not those exerting along the Z' directions.

In this manner, said third attachment 8 jointly ensures with the two other attachments 6a, 6b, the take-up of the moment exerting along the second direction Y'.

Finally, even if it has not been shown, it is noted that it is preferably foreseen to have one or a plurality of nacelle cowls mounted on the rigid structure 10, and in particular on the lateral boxes 24a, 24b.

Figure 10:
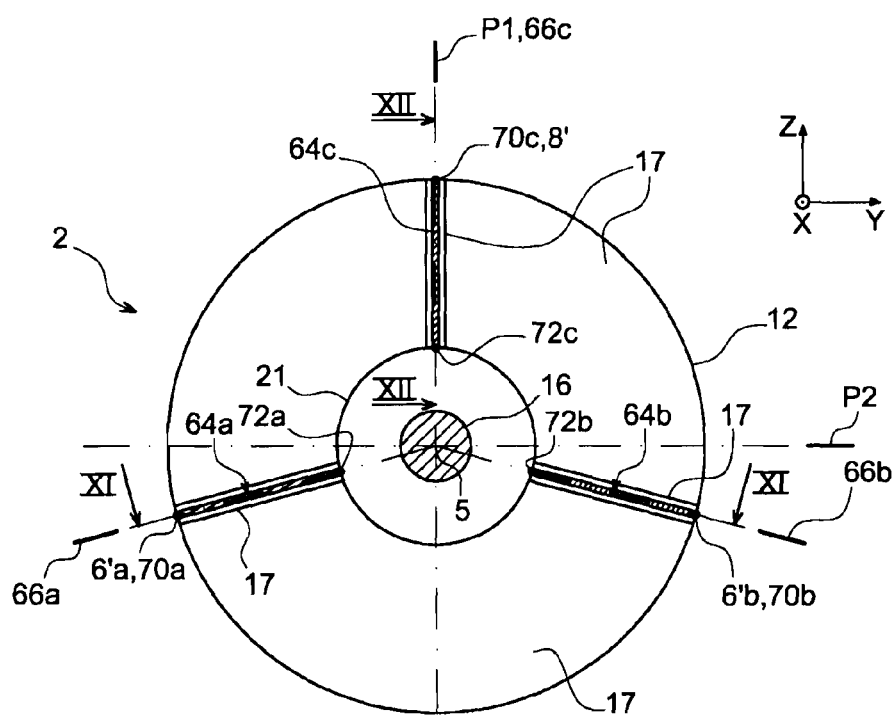
FIG. 10 shows a transverse cross-section view, according to another preferred embodiment in which the turbojet integrates the reinforcing structures linking the fan frame to the central casing, this figure also corresponds to a cross-section view taken along the line X-X in FIG. 11.
Figure 12:
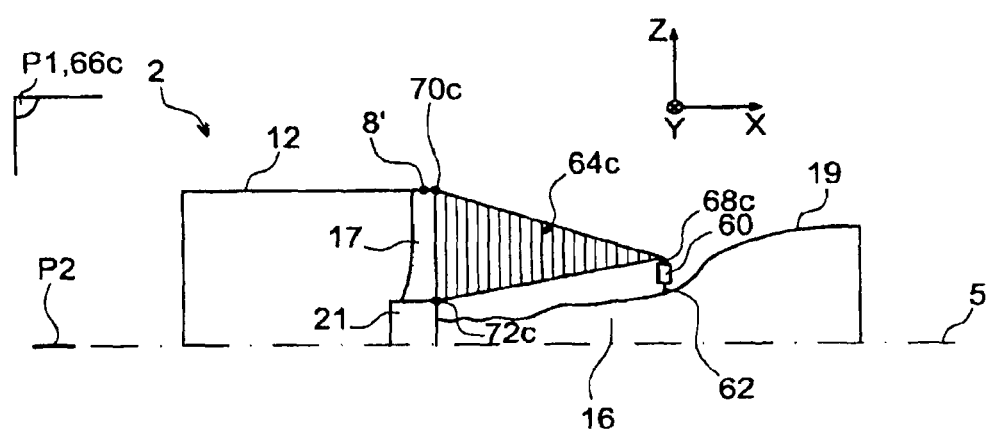
FIG. 12 shows a cross-section view taken along the line XII-XII of FIG. 10.

In FIGS. 10 and 12, another preferred embodiment of the invention is shown in which the turbojet integrates, in addition, the reinforcing structures linking the fan frame to the central box. In the figures, the turbojet 2 is shown in a position such as adopted when it is suspended beneath the wing. Nevertheless, the embodiment described can be envisaged for any positioning of the turbojet, notably when it is moved to the aft part of the fuselage, such as shown in FIGS. 8 and 9.

Firstly, an annular structure for transferring loads 60 also called the rim or ring is provided, surrounding the central box 16 and centered on the axis 5. This ring 60, radially spaced from the central box 16, is linked mechanically to the latter via mounting means 62, for example of the strut type, such as will be described in detail hereafter. Preferably, this ring 60 will be situated towards the rear of the central box 16, for example downstream of the combustion chamber and more preferably at the level of the inter-turbine casing and opposite a fixed structural element, ideally at the end of the high pressure turbine casing. For a better support, same is preferentially situated straight in front of a transmission shaft bearing.

Firstly, a reinforcing structure forming a shearing plane, which is associated with each of the first and second engine attachments 6a, 6b is provided.

Thus, concerning the first engine attachment 6a, a reinforcing structure 64a forming a shearing plane is arranged in the imaginary radial plane 66a passing through the axis 5, and also passing by the anchoring point 6'a of said attachment 6a.

Figure 11:
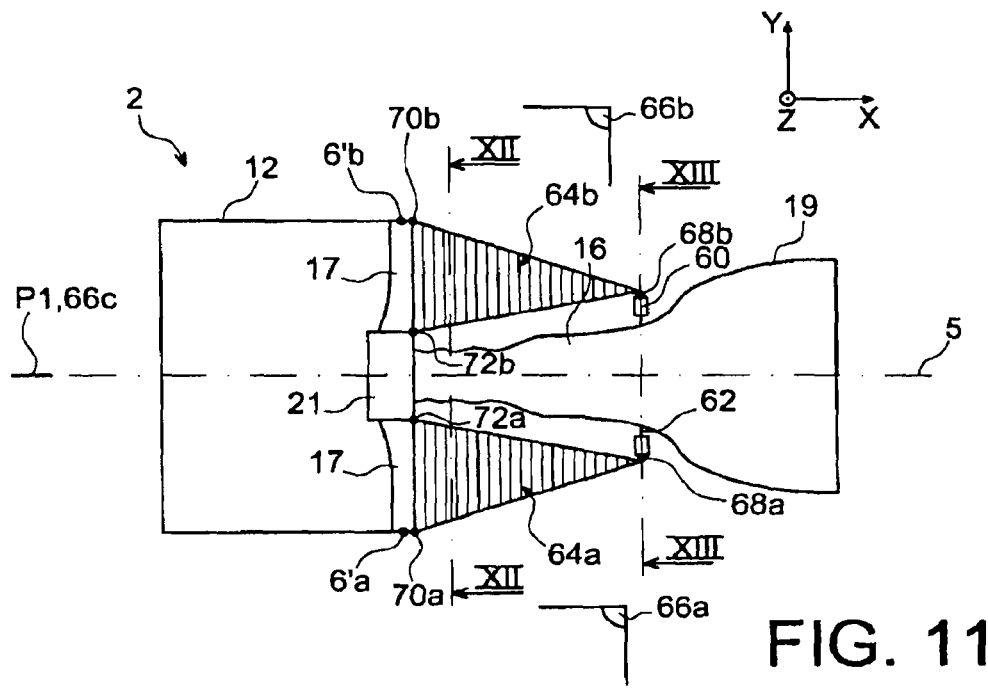
FIG. 11 shows a cross-section view taken along the line XI-XI of FIG. 10.

As is more visible in FIG. 11, the structure 64a preferably takes a substantially triangular plane shape, possibly with holes to reduce the mass. The triangle is rigidly attached at the level of the ring 60 at a first anchoring point 68a, at the level of the fan frame 12, near the point 6'a situated in the same imaginary plane 66a, at a second anchoring point 70a, and at the level of the junction between the structural arm 17 and the intermediate casing 21, at a third anchoring point 72a. Thus, the triangular structure 64a forming a shearing plane has a base parallel to and along the structural arm 17 placed in the imaginary plane 66a, the latter here being inclined with respect to the Y and Z directions, because of the displacement of the attachment 6a below the diametrical plane P2.

The imaginary plane 66a, in which the triangular reinforcing structure is inscribed, is here radial, that is to say that it passes through the longitudinal axis 5. Nevertheless, it could be disposed otherwise, that is to say parallel to the longitudinal axis 5, without being integral with it. This is namely the case when the structural arms are not themselves radial, but inclined in a transverse plane such that their axis does not intercept the longitudinal axis 5. In such a configuration, the preference is still to arrange that the triangular structure 64a has a base parallel to and along the structural arm 17, placed in the imaginary axis 66a. In other terms, it is foreseen preferably that the triangular structure 64a is found in the rear prolongation of the structural arms 17, said arm and the structure 64a being situated therefore in the same imaginary plane 66a. It is noted that this specificity is equally applicable for each of the other reinforcing structures described below.

In the same manner, an identical or similar design is adopted for the second attachment 6b. In consequence, in the figures, the reference numbers attached to the elements relating to the reinforcing structure 64b forming a shearing plane arranged in the imaginary radial plane 66b, carry therefore the letter "b", instead of the letter "a" used for the identical elements related to the reinforcing structure 64a.

Thus, the structures 64a, 64b are found to be symmetrical with respect to the diametrical plane P1, also corresponding to another imaginary radial plane 66c, in which the third reinforcing structure 64c is found, forming a shearing plane attached to the third engine attachment 8.

Here also, in the figures, the reference numbers attached to the elements relating to the reinforcing structure 64c form a shearing plane arranged in the imaginary radial plane 66c, therefore carry the letter "c", instead of the letter "a" used for the identical elements related to with the reinforcing structure 64a.

The three structures 64a, 64b, 64c, preferably substantially identical, globally permit the bracing of the central casing 16, thus limiting flexing, even in the case of inertial strains exerting in the imaginary planes 66a, 66b, 66c, the latter corresponding to the vertical plane. In addition, they allow a limitation of the deformation of the structural arms 17 in and close to the imaginary planes, advantageously leading to a limitation of the "ovalization" effect of the fan frame 12.

Preferably, the structures 64a, 64b, 64c can each play a role in splitting up the air in the bypass flow of the turbojet; these splitting having for principal function of integrating the passage of systems and/or presenting an acoustical treatment, all while constituting aerodynamic surfaces.

Finally, to conserve the isostatic take-up of isostatic loads, the reinforcing structures lack direct mechanical connection with said strut, and also with the nacelle.

Figure 13:
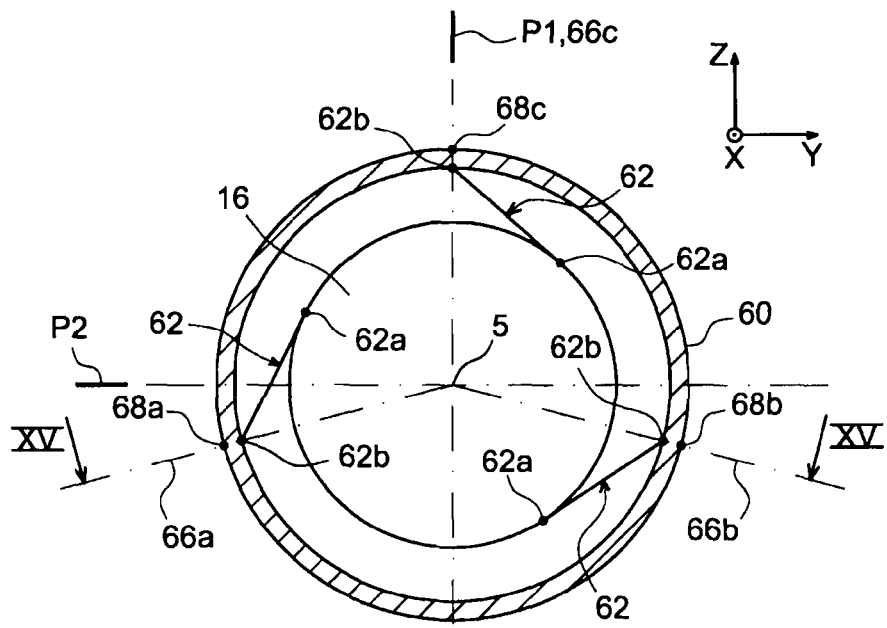
FIG. 13 shows schematically a transverse cross-section view of the means of mounting placed between the annular structure for transferring loads, and the central casing of the turbojet.
Figure 14:
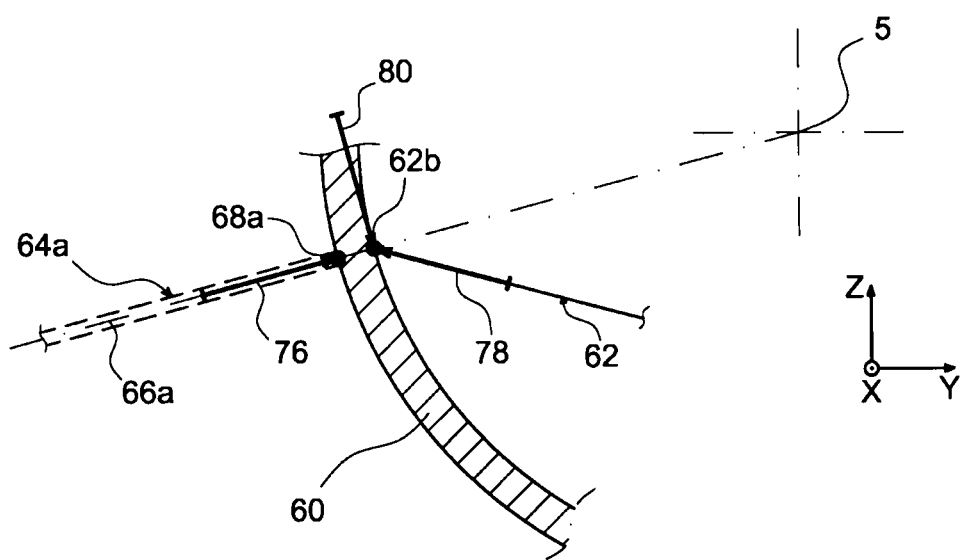
FIG. 14 shows schematically a partial, enlarged view of the view shown in FIG. 13, of the repartition of the loads on the annular structure, at the level of the points of introduction of loads.

In reference now to FIGS. 13 and 14, a preferred embodiment of the means of mounting 62 placed between the annular structure for the transfer of loads 60, and the central casing 16, can be seen.

Firstly, it is noted that the anchoring points 68a, 68b, 68c cited above each form a load introduction point in the ring 60, these points being spread circumferentially around the latter.

In addition, because of the preferential radial orientation of the aforesaid reinforcing structures associated with these points 68a, 68b, 68c, the load stressing the ring is also oriented radially, that is to say, passing through a direction crossing the axis 5, on which the same ring is centered. Nevertheless, it is recalled that the reinforcing structures could be oriented otherwise than radially, without departing from the scope of the invention.

To each of these three points 68a, 68b, 68c is associated at least one linking strut 62, each spar being, looking head-on along the axis 5 as in FIG. 13, disposed tangentially with respect to the central casing 16. More precisely, the struts 62 are preferentially all disposed substantially in the same transverse plane of the turbojet.

It is foreseen that preferably a single strut 62 issues from each upper 68c and lower 68a, 68b points.

For each of the struts 62, it is provided with an inside end 62a attached by a ball-joint onto the central casing 16, as well as an outside end 62b attached by a ball-joint onto the ring 60. More particularly, this outside end 62b is arranged such as to be crossed, on a head-on view, by an imaginary radial plane 66a, 66b, 66c passing through the longitudinal axis 5 and the concerned load introduction points 68a, 68b, 68c. For information only, it follows, generally, that for a given engine attachment, the anchoring point of the attachment onto the fan frame, the anchoring point of the reinforcing structure associated with fan frame, the reinforcing structure itself, the load introduction point into the ring forming an anchoring point in the reinforcing structure on this ring and the outer end of the associated strut, are all arranged in the same imaginary radial plane, in which is situated therefore, also preferentially, one of the structural arms linking the casings 12 and 16.

The ball-joint attachments at the ends of the struts 62 allow an optimal management of the thermal dilatation of the central casing with respect to the annular structure 60 that surrounds same, at the same time in the radial direction and in the longitudinal direction. Indeed, the struts with ball-joints positioned as described above are easily capable of accompanying the deformations of the central casing in these two directions, when the latter dilates, without provoking harmful stresses.

In addition, as seen in FIG. 13, each of the three struts 62b extends in the same circumferential direction from the outer end thereof, for example clockwise as has been shown. With this configuration, in the case of a thermal differential dilatation between the ring 60 and the casing 16 or the struts, the ring 60 can turn around the central casing 16, while still staying co-axial with said casing.

With reference more specifically to FIG. 14, the repartition of loads acting at the level of the load introduction point 68a is detailed, the principal staying analogous for the two other points 68b, 68c.

At the level of the load introduction point 68a, the load 76 coming from the associated reinforcing structure 64a is arranged substantially radially, and more particularly in the corresponding imaginary radial plane 66a. The radial load 76 is taken up by the load of compression or contraction 78 in the strut 62, and by the necessarily, substantially tangential load 80, in the ring 60, said load being also called the membrane load. For this reason, at the level of each of the three load introduction points of the ring, this tends to respond to the mechanical stresses of the reinforcing structures by a substantially tangential load, strongly limiting the risks of ovalization.

Figure 13A:
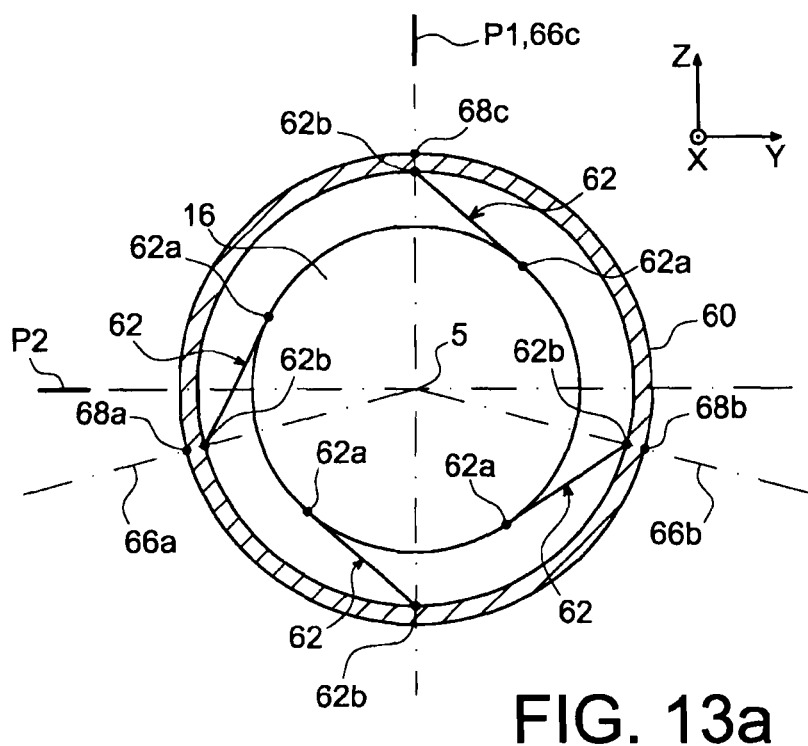
FIG. 13a shows a similar view to that of FIG. 13, the means of mounting being in an alternative embodiment.

With reference to FIG. 13a showing an alternative embodiment, in addition to the three struts 62 described above with reference to FIG. 13, a fourth strut 62 judiciously placed will be provided.

Indeed, to uniformly repartition the loads, to the three struts issued respectively from the load introduction points 68a, 68b, 68c, a fourth strut 62 linking the ring 60 to the casing 16 is associated, this fourth strut being disposed symmetrically with respect to the strut attached to the third engine attachment, symmetrically central to the center constituted by the axis 5. Thus, the outside end 62b is also arranged to be crossed, in a head-on view, by the imaginary radial plane 66c passing through the longitudinal axis 5 and the concerned introduction point for loads 68c.

In addition, as seen in FIG. 13a, each of the three struts therefore extends in the same circumferential direction from the outer end thereof 62b, for example clockwise as has been shown. Still here, in the case of a thermal differential dilatation between the ring 60 and the casing 16 or the struts, the ring 60 can turn around the central casing 16, while still staying co-axial with said casing.

Figure 15:
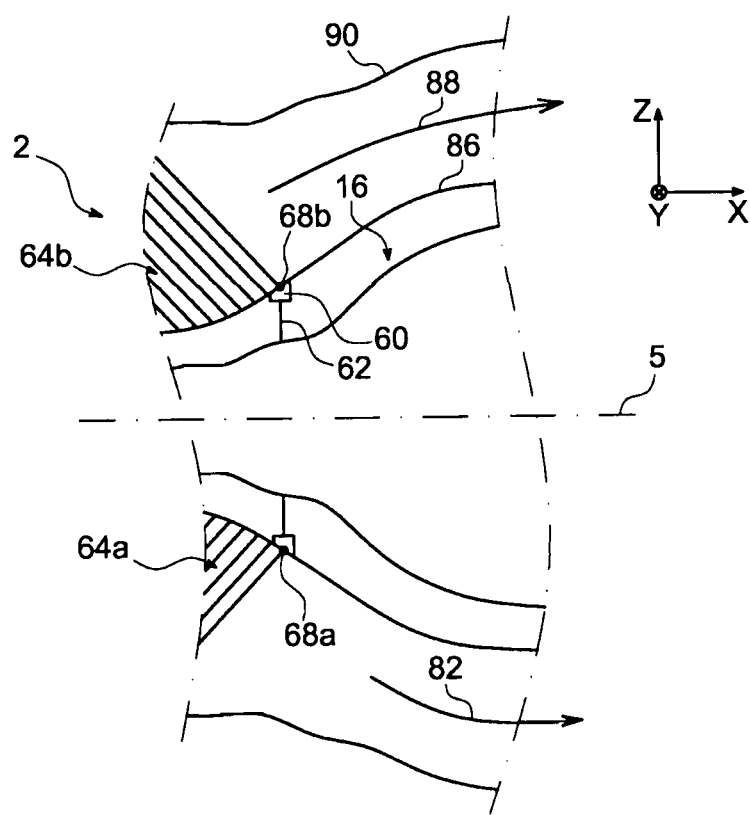
FIG. 15 shows another preferred embodiment, corresponding to a cross-section view along the line XV-XV of FIG. 13.

In FIG. 15 showing another embodiment, the struts 62 disposed in a manner shown above are still linked to the ring 60, which is itself not only linked to the load introduction points 68a, 68b, 68c, but also carried by a structure 86 of internal radial delimitation of the annular bypass air channel 88 (IFS, Inlet Fan Structure). For information only, this structure 86 is disposed radially towards the inside with respect to a structure 90 of external radial delimitation of the annular channel for the bypass air (OFS, Outlet fan Structure), itself situated in the rear prolongation of the internal skins of the lateral boxes of the mounting strut.

In such a case, as mentioned above, it can indeed be foreseen that the reinforcing structures 64a, 64b, 64c feeding along the internal structure 80, play an additional role of splitting the air in the bypass flow of the turbo.

In the FIGS. 13 and 15, the turbojet 2 is shown in a position such as adopted when it is suspended beneath the wing. Nevertheless, here again, the particular means of mounting 62, described above, can be envisaged for any positioning of the turbojet, namely when it is moved to the aft part of the fuselage, such as shown in FIGS. 8 and 9.

Of course, various modifications can be brought by a person skilled in the art to the aircraft engine assembly 1 that has been described, uniquely as a non-limiting example. In this regard, it is noted that the two optional specificities respectively shown in FIGS. 10 to 12 and in FIGS. 13 to 15 have been described in combination, but that they can be foreseen one without the other, without departing from the scope of the invention.

The invention claimed is:

1. An aircraft engine assembly comprising:
    a turbojet comprising a fan frame, an intermediate casing radially situated to an interior with respect to the fan frame and linked to the fan frame by a plurality of structural arms, and a central casing extending the intermediate casing towards a rear; and
    a mounting strut comprising a rigid structure comprising a longitudinal box and two lateral boxes integrated with the longitudinal box and arranged on two sides of the longitudinal box,
    the mounting strut further comprising a mount to mount the turbojet onto the rigid structure, the mount comprising first, second, and third forward engine attachments to take up thrust loads brought to the fan frame, and arranged such that the third forward engine attachment passes through a first diametrical plane of the turbojet, the first and second forward engine attachments, respectively carried on the two lateral boxes, being arranged on one side and another in the first diametrical plane, wherein
    the first and second forward engine attachments are respectively brought to the fan frame at only two points, which are situated beyond a second diametrical plane of the turbojet, orthogonal to the first diametrical plane, with respect to the third forward engine attachment, such that the two lateral boxes include ends that carry the first and second forward engine attachments with the ends extending beyond the second diametrical plane of the turbojet, and
    the lateral boxes each include a structural portion including a curved contour and a structural portion including a straight contour, and the structural portion including the straight contour carries one of the first and second forward engine attachments and extends beyond the second diametrical plane of the turbojet.

2. An assembly for an aircraft according to claim 1, wherein the first and second forward engine attachments that take up the thrust loads are situated symmetrically with respect to the first diametrical plane defined by a longitudinal axis of the turbojet parallel to a longitudinal direction of the turbojet, and a first direction of the turbojet orthogonal to the longitudinal direction.

3. An assembly for an aircraft according to claim 2, wherein in a head-on view along the longitudinal axis of the turbojet, an angle in a plane perpendicular to both the first and second diametrical planes and whose center is located along the longitudinal axis of the turbojet, between anchoring points of the third and first engine attachment, is strictly greater than 90° and less than or equal to 120°, or is between, but not including, 90° and 110°, and an angle in the plane perpendicular to both the first and second diametrical planes and whose center is located along the longitudinal axis of the turbojet, between anchoring points of the third and second engine attachment, is greater or equal to 240° and strictly less than 270°, or between, but not including, 250° and 270°.

4. An assembly for an aircraft according to claim 2, wherein the first and second forward engine attachments are each configured to take up loads exerted along the longitudinal direction and along the first direction of the turbojet, and the third forward engine attachment is configured to take up the loads exerted along the longitudinal direction and along a second direction of the turbojet, orthogonal to the first direction and to the longitudinal direction.

5. An assembly for an aircraft according to claim 4, wherein the first direction of the turbojet corresponds to a vertical direction of the turbojet, and the second direction of the turbojet corresponds to a transverse direction of the turbojet.

6. An assembly for an aircraft according to claim 1, wherein the mount is only constituted by the first, second, and third forward engine attachments.

7. An assembly for an aircraft according to claim 1, further comprising:
    an annular structure to transfer loads around the central casing and linked mechanically to the central casing via a mounting, and
    reinforcing structures, each of the first and second forward engine attachments is associated with one of the reinforcing structures, and each of the reinforcing structures forming a shearing plane and being rigidly attached:
        at a level of the annular structure in a first anchoring point;
        at a level of the fan frame and in a second anchoring point; and
        at a level of the structural arm or of the intermediate casing in a third anchoring point, each of the reinforcing structures lying along an imaginary plane, which is parallel to a longitudinal axis of the turbojet or passes through the longitudinal axis of the turbojet, and equally passing through the second anchoring point of the forward engine attachment on the fan frame.

8. An assembly for an aircraft according to claim 1, further comprising:

an annular structure to take up loads surrounding the central casing and linked mechanically to the latter by a mounting comprising a plurality of attaching struts, the annular structure being attached to a plurality of structures arranged externally with respect to the annular structure and radially stressing respectively in a plurality of load introduction points spread circumferentially on the latter, and wherein at least one of the attaching struts is associated with each of the load introduction points, the at least one of the attaching struts being, in a head-on view along a longitudinal axis of the turbojet, disposed tangentially with respect to the central casing, and comprising an inner end attached to the central casing, and an outer end attached to the annular structure so as to be crossed by an imaginary radial plane passing through the longitudinal axis of the turbojet, and also through one of the load introduction points.

9. An aircraft comprising at least one engine assembly according to claim 1, assembled on a wing or on a part of an aft fuselage of the aircraft.

10. An assembly for an aircraft according to claim 1, wherein the first, second, and third forward engine attachments are each aligned with one of the plurality of structural arms.

11. An assembly for an aircraft according to claim 1, wherein the first, second, and third forward engine attachments form an isostatic take-up system of the thrust loads.

12. An assembly for an aircraft according to claim 1, wherein an external closing skin of each of the lateral boxes constitutes a part on an external aerodynamic surface of a nacelle.

13. An assembly for an aircraft according to claim 1, wherein an internal closing skin of each of the lateral boxes is part of an external radial delimitation of an annular bypass channel.

14. An assembly for an aircraft according to claim 1, wherein the lateral boxes are entirely situated above the fan frame.

* * * * *